United States Patent
Dexter et al.

[15] 3,678,095

[45] July 18, 1972

[54] SUBSTITUTED DERIVATIVES OF MALONIC ACID USEFUL AS STABILIZERS

[72] Inventors: Martin Dexter, Briarcliff Manor; John Denon Spivack, Spring Valley, both of N.Y.

[73] Assignee: Geigy Chemical Corporation, Greenburgh, N.Y.

[22] Filed: July 17, 1970

[21] Appl. No.: 55,938

Related U.S. Application Data

[63] Continuation-in-part of Ser. No. 616,801, Feb. 17, 1967.

[52] U.S. Cl..................260/473 S, 260/45.85, 260/398.5, 260/590, 260/810, 44/70, 99/163, 252/57
[51] Int. Cl...........................................................C07c 69/76
[58] Field of Search....................................260/473 S, 465 P

[56] References Cited

UNITED STATES PATENTS 3,112,338  11/1963  Smutny et al. ...................260/473 R

OTHER PUBLICATIONS

Eggensperger, Heinz et al, Chem. Abst. 71 13810e (1969)
Gilles, Chem. Abst. 71 4113c (1969)
Dexter et al, Chem. Ast. 71 102930m (1969)

*Primary Examiner*—Lorraine A. Weinberger
*Assistant Examiner*—John F. Tenapane
*Attorney*—Karl F. Jorda and Nestor W. Shust

[57] ABSTRACT

Derivatives of malonic acid substituted with groups containing a hindered phenol are disclosed. The compounds are stabilizers suitable for stabilizing numerous substrates of organic material subject to oxidative deterioration, in particular polypropylene. Synergistic combinations of these compounds and dialkyl thiodipropionates are disclosed.

8 Claims, No Drawings

SUBSTITUTED DERIVATIVES OF MALONIC ACID USEFUL AS STABILIZERS

THE INVENTION

This is a continuation-in-part of our copending application Ser. No. 616,801 filed Feb. 17, 1967.

Natural or synthetic resins, such as polypropylene and polyethylene, are often subject to oxidative deterioration. Other unstable organic materials, such as synthetic lubricants, hydrocarbons, natural and synthetic rubbers, oils of animal or vegetable origin, and the like are also unstable to thermal or oxidative deterioration. Such materials may also be unstable to ultraviolet or visible light.

It is a principal object of the present invention, therefore, to provide new stabilizers for organic material. It is a further object to provide compositions by incorporating in organic material normally subject to deterioration, stabilizing amounts of a stabilizer as herein described. Other objects of the invention will be apparent from what follows.

It has been found that the compounds of this invention are effective in various organic materials, normally subject to oxidative deterioration. The stabilizers of the invention comprise substituted derivatives of malonic acid and related compounds of the formula:

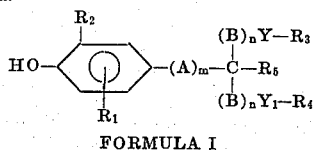

FORMULA I where $R_1$ and $R_2$ are alkyl of one to 18 carbon atoms or cycloalkyl of five to 12 carbon atoms. Alkyl of one to eight carbon atoms is preferred and most preferably $R_1$ and $R_2$ are tertiary butyl positioned ortho to the hydroxy group.

A is alkylene of one to 12 carbon atoms. It may be branched or straight chain. Preferably it has one to six carbon atoms, and most preferably it is methylene.

B is lower alkylene, i.e., alkylene of one to six carbon atoms, and may be branched or straight chain. Y and $U_1$ are both

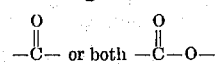

$m$ and $n$ are 0 or 1 $R_3$ and $R_4$ are phenyl or substituted phenyl; $Y_5$ is cyano, $C_1$–$C_4$ alkyl or

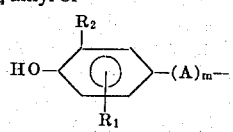

provided that when Y and $Y_1$ are carbonyl, $R_3$ and $R_4$ may also be amino, $C_1$–$C_{18}$ alkyl or alkylthioalkyl; provided further that when m is 0 and n is 1, Y and $R_3$ taken together and $Y_1$ and $R_4$ taken together may also be cyano or cyanoloweralkyl; and provided further that when $R_5$ is cyano, $R_3$ and $R_4$ may also be $C_1$–$C_{24}$ alkyl or amino.

It is understood that in this application and the appended claims the term "alkyl" contemplates both branched and straight chain. Representative of such alkyl groups are thus methyl, ethyl, propyl, n-butyl, i-propyl, s-butyl, t-butyl, octyl, decyl, dodecyl, tetradecyl, octadecyl, and the like.

As previously stated, the compounds of the present invention are useful in the stabilization of organic material normally subject to deterioration. The efficacy of these compounds is evident for example from the greatly increased stability of polymeric material containing a compound of this invention when subject to oxidative deterioration. In this specification is is understood that polymeric material includes both homopolymeric and copolymeric, such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadiene and styrene; poly-α-olefins such as polymethylene, polyethylene, polypropylene, polybutylene, poly-4-methyl pentene-1, polyisoprene and the like, including copolymers of poly-α-olefins; polyurethanes such as are prepared from polyols and organic polyisocyanates; polyamides, such as polyhexamethylene adipamide; polyesters such as polymethylene terephthalates; polymethylmethacrylate; polycarbonates; polyacetals; polystyrene; polyphenylene oxide; polyethyleneoxide; polyacrylics such as polyacrylonitrile; and the like, including mixtures of the foregoing such as those of high impact polystyrene containing copolymers of butadiene and styrene and those formed by the copolymerization of acrylonitrile, butadiene and/or styrene. The preferred polymeric material for stabilization is polypropylene.

Polymeric materials, such as the foregoing, find use as thermoplastic molding or coating agents. Moreover, because of their high dielectric strength and its resistance to water, such materials are particularly useful as insulators or dielectrics in condensers and similar equipment. It is known that these polyolefins, such as polyethylene and polypropylene, are attacked by oxygen, particularly when exposed to the atmosphere and at elevated temperatures. During use or manufacture, for example, the desirable properties of the polyolefins are often impaired by oxidative deterioration. Such degradation causes loss in dielectric properties, discoloration, embrittlement, gelation, and the like. In addition to overcoming these difficulties, the compositions of this invention are also stabilized against degradation caused by heat and light.

The compounds of this invention are also particularly useful in stabilizing lubricating oils of various types including aliphatic esters, polyalkylene oxides, silicones, esters of phosphoric and silicic acids, highly fluorine-substituted hydrocarbons, and the like. Specifically, such aliphatic esters which are usefully stabilized comprise dihexyl azelate, di-(2-ethylhexyl) azelate, di-(3,5,5-trimethylhexyl) glutarate, di-(3,5,5-trimethylpentyl) glutarate, di-(2-ethylhexyl) pimelate, di-2(2-ethylhexyl) adipate, diisoamyl adipate, triamyl tricarballylate, pentaerythritol tetracaproate, dipropylene glycol dipelargonate, 1,5-pentanediol di-2(2-ethylhexanoate), and the like. Other specific lubricants include polyisopropylene oxide, polyisopropylene oxide diether, polyisopropylene oxide diester, and the like, as well as methyl silicone, methylphenyl silicone, tetraisoctyl silicate, etc. and fluorinated oils, such as perfluorohydrocarbons.

The present invention also relates to the stabilization of fatty materials, including oils of animal or vegetable origin, which tend to deteriorate on standing or exposure to atmospheric oxygen. Also within the scope of the invention are saturated and unsaturated hydrocarbons which tend to deteriorate on storage and use, such as for example, gasolines, jet fuels, diesel oils, mineral oils, and the like. Such hydrocarbons are protected against gum formation, discoloration and other deterioration with the stabilizers of the present invention. Greases and cutting oils may also be stabilized in the same fashion.

These compounds are especially useful in stabilizing polyolefinic material, particularly polypropylene. Fatty acids, such as stearic acid, resins such as acrylonitrilebutadiene-styrene (ABS) terpolymers and polyphenylene oxide, cyclohexene and synthetic oils, such as trimethylolpropane esters of acetic acid, n-valeric acid, hexanoic acid, caprylic acid, pelargonic acid, 2-ethylhexanoic acid, 2-ethylpropanoic acid, and 2-methylpentanoic acid, and mixtures thereof are also very effectively stabilized with the foregoing stabilizers.

The stabilizers of this invention are also useful in stabilizing rubber, e.g. artificial and natural rubber. Other examples of rubber which may be stabilized according to the invention include polybutadiene rubber, polyisoprene rubber, styrene-butadiene rubber, butyl rubber, nitrile rubber, neoprene rubber and blends of artificial rubber with natural rubber, such as for example natural rubber with polybutadiene rubber. Broadly contemplated is the stabilization of any rubber normally subject to degradation.

Particularly preferred stabilizers of the invention are di-(4'tertiary octylphenyl)-2,2-bis-(3'',5'' di-t-butyl-4''-hydroxybenzyl) malonate, diphenyl-2,2-bis(3',5' di-t-butyl-4'-hydroxybenzyl) malonate and di-4'-t-butylphenyl-2,2-bis (3'',5''<~*di-t-butyl*-4''-hydroxybenzyl) malonate.

In general, stabilizers of the invention are employed in a concentration of from about 0.001 percent to about 10 percent by weight, preferably from about 0.1 percent to about 1 percent by weight. The specific concentration employed varies with the unstabilized material and the specific stabilizer. When mixtures of two or more stabilizers are employed in an unstable material, usually the total amount of added stabilizer does not exceed 10 percent of the total stabilized material.

The stabilizer compounds of this invention may be used to stabilize organic material in combination with other additive agents, such as e.g. antioxidants, antiozonants, pourpoint depressants, corrosion and rust inhibitors, dispersing agent, chelating agents, surface active agents, demulsifiers, antifoaming agents, carbon black, accelerators, plasticizers, color stabilizers, heat stabilizers, ultraviolet absorbers, dyes and pigments, fillers, etc.

Merely by way of illustration, the following reaction schemes may be employed in preparing the compounds of this invention. Alternative methods will be readily apparent to those skilled in the art.

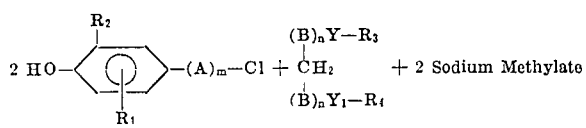

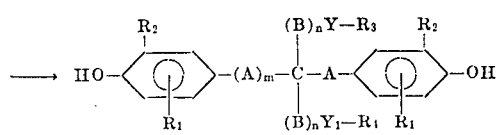

when n=0.

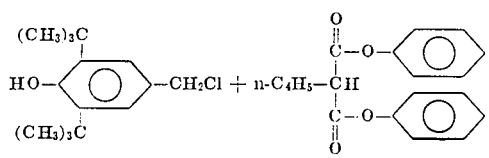

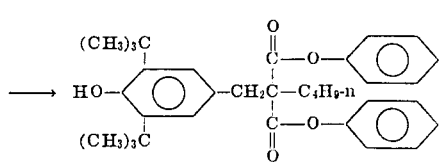

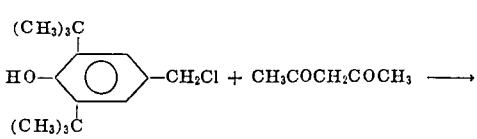

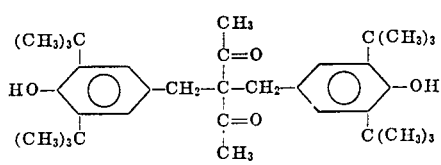

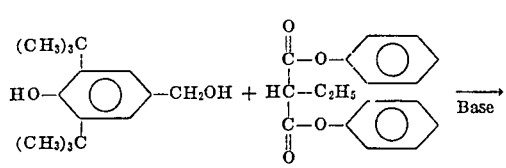

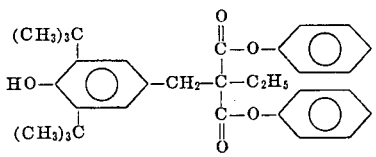

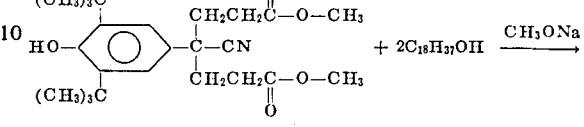

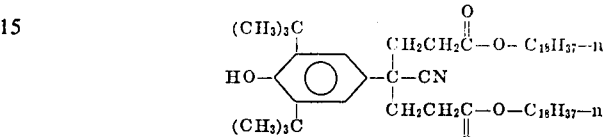

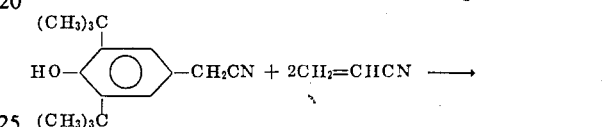

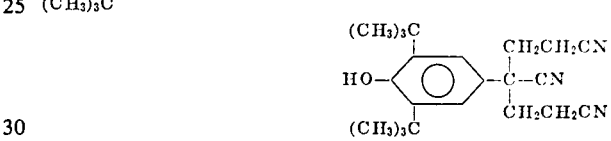

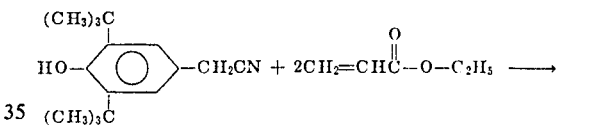

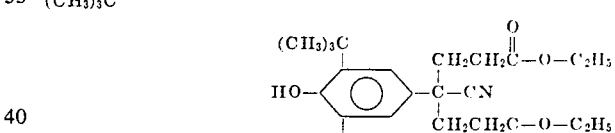

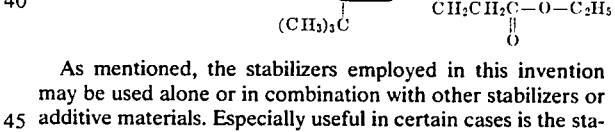

As mentioned, the stabilizers employed in this invention may be used alone or in combination with other stabilizers or additive materials. Especially useful in certain cases is the stabilizer di-lauryl-beta-thiodipropionate. Special mention also is made of di-stearyl-beta-thiodipropionate.

Broadly, compounds of the formula

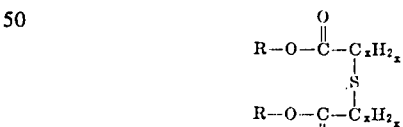

wherein R is an alkyl group having from six to 24 carbon atoms and X is an integer from 1 to 6, are useful stabilizers in combination with the compounds of the FORMULA I of the invention.

In this specification, the term "stabilization" includes protection not merely against oxidative deterioration but also protection against deterioration caused by thermal effects, visible and/or ultraviolet radiation, etc. Thus the stabilizers of the invention are contemplated as acting to protect unstable materials not only against oxidative deterioration but also against other types of deterioration such as thermal degradation or degradation caused by visible and/or ultraviolet light, particle radiation, etc.

The compositions are prepared by a number of means, depending on the substrate. For example, the instant stabilizers can be mixed into liquid substrates and can be milled into thermoplastic substrates. For addition to varnishes, the stabilizer can be dissolved in a co-solvent and this added to the varnish. As mentioned hereinbefore and exemplified hereinafter, levels of the stabilizers in the substrate may vary considerably depending on the particular end application, degree of protection desired, variations in the substrate, and presence of synergizing stabilizers (ultraviolet absorbers, dialkyl thiodipropionates, and the like).

Selecting the proper use level is well within the capabilities of those skilled in the art. Addition of the instant stabilizers imparts little or no color to most substrates and, after formulation, they are characterized by substantial ability to retain good color under processing conditions and weathering.

The instant invention provides polyolefin compositions protected against thermal and oxidative degradation during processing. It provides minimized melt-flow drift, and extends the service life of finished articles. Particularly noteworthy are the instant compositions excellent color retention under prolonged heat or light exposure, and their resistance to extraction by boiling water and alkaline detergents.

The following examples describing certain representative embodiments of this invention will serve to further illustrate the nature of the invention. It is to be understood that the examples are merely illustrative and intended to enable those skilled in the art to practice the invention in all of the embodiments flowing therefrom and do not in any way limit the scope of the invention defined in the claims.

In the examples, parts are by weight unless otherwise indicated and the relationship between parts by weight and parts by volume is as that between grams and cubic centimeters.

EXAMPLE 1

3,3-Bis-(3',5'-di-t-butyl-4'-hydroxybenzyl)-2,4-pentanedione 5.1 parts of sodium (0.22 moles) is dissolved in 100 parts of methanol by heating, finally at reflux temperatures until dissolved. The sodium methylate solution is cooled to 15° C. and 10.0 parts of 2,4-pentanedione (0.10 moles) added. A heptane solution of 3,5-di-t-butyl-4-hydroxybenzyl chloride (83 parts, 61.1 percent, 0.20 moles) is added dropwise to the methanolic solution over a period of 45 minutes at 10° – 15° C., the resulting reaction mixture being stirred at room temperature for 2 hours, and at 45° – 50° C. for 1 hour. The reaction mixture is made acid with about 5 parts of glacial acetic acid, and the solvents removed by distillation at 20 mm. Hg. pressure. The residue is triturated with 200 parts by volume of hexane, washed with hot water and dried in the vacuum oven at 100 mm. Hg. pressure at 70° C. for 16 hours. 3,3-bis-(3',5'-di-ti-butyl-4'-hydroxybenzyl)-2,4-pentanedione is obtained in the form of white crystals melting at 155° C. after two crystallizations from isopropanol.

Analysis:
Calculated for C$_{35}$H$_{52}$O$_4$: Mol. Wt. 136.7

| | C | H |
|---|---|---|
| | 78.31% | 9.77% |
| Found: | 78.06% | 9.79% |

EXAMPLE 2

(3',5'di-t-butyl-4'-hydroxyphenyl)-Cyanopimelonitrile 24.5 Parts of 3',5'-di-t-butyl-4'-hydroxybenzyl cyanide (0.10 moles) is dissolved at 40° C. in 150 parts of t-butanol containing 3.36 parts (0.03 moles of potassium-t-butoxide to give a clear green solution. 10.6 parts of acrylonitrile is then added dropwise over a period of 15 minutes and the reaction mixture heated a reflux for 5 hours during which time the color changes to yellowish brown. The reaction mixture is cooled to 30° C. 100 parts of 10 percent acetic acid is added and the reaction mixture cooled to 10° C. The precipitated crystals are filtered, washed with water and dried. The crystals melt at 124° – 126° C. Recrystallization from a solvent mixture of 75:25 t-butanol-isopropanol yields white crystals melting at 124°–126° C.

Analysis:
Calculated for C$_{22}$H$_{29}$ON$_3$

| | C | H | N |
|---|---|---|---|
| Found: | 75.17% | 8.31% | 11.95% |
| | 75.57% | 7.98% | 12.20% |

If acrylamide is substituted for acrylonitrile in the above example, then 4-(3',5'-di-t-butyl-4'-hydroxyphenyl)-4-cyano-1,7-heptanedioic acid amid is obtained.

If octadecyl acrylate is substituted for acrylonitrile in the above example, then di-n-octadecyl-4-(3',5'-di-t-butyl-4'-hydroxyphenyl)-4-cyanopimelate, having a melting point of 70°-72° C. is obtained.

EXAMPLE 3

Dimethyl 4-(3',5'-di-t-butyl-4'-hydroxyphenyl)-4-Cyanopimelate 17.5 parts of 4-(3',5'-di-t-butyl-4'-hydroxyphenyl)-4-cyanopimelonitrile is dissolved in 100 parts of methanol and then cooled to −10° C., the fine suspension being saturated with gaseous hydrogen chloride at −5° to 0° C. over a period of 40 minutes. The reaction mixture is then stirred and heated at reflux for 30 minutes. The resultant crystal slurry is then poured onto 500 parts of ice. After the ice has melted the crystals are filtered, washed with water, then redispersed in water and heated on the steam bath for 1 ½ hours. The dispersion is then cooled, the precipitate being filtered and taken up in ether. The ether solution is then washed with sodium bicarbonate and dried over sodium sulfate. The ether solution is concentrated in vacuum to yield the product as a crystalline residue. The residue is than recrystallized from n-hexane yielding white crystals melting at 110°–112° C.

Analysis:
Calculated for C$_{24}$H$_{35}$O$_5$N

| | C | H | N |
|---|---|---|---|
| | 69.03% | 8.44% | 3.35% |
| Found: | 69.14% | 8.45% | 3.33% |

EXAMPLE 4

Di-Phenyl-2,2-Bis-(3',5'-di-t-butyl-4'-hydroxybenzyl) Malonate

Forty-seven grams of phenol, 100 ml. of hexene and 35 g. of malonyl chloride were refluxed for one hour, at the end of which time hydrogen chloride evolutions had practically ceased. The reaction mixture was cooled to room temperature and washed, first with water, then with a dilute aqueous solution of sodium bicarbonate and then again with water and dried over sodium sulfate. After filtration and evaporation of the solvent, the product, diphenyl malonate, crystallized out. It was purified by recrystallization from aqueous ethanol. M.P. 52° C.

A portion of the diphenyl malonate so prepared (0.25 mols) is suspended in toluene, and cooled, with stirring, to −10° C. Sodium amide (0.55 mols) is then added and within 90 minutes a 45 percent hexane solution containing 0.55 mols of 3,5,-di-tert-butyl-4-hydroxybenzyl chloride is added at the same temperature. The mixture is stirred at ambient temperature for 1 hour, heated to 55° C. and kept at that temperature for another hour. The reaction is extracted three times with water and the hexane solution is evaporated to dryness under vacuum. The residue is treated with hot methanol, filtered, and washed with hexane and then with water. The resulting diphenyl-2,2-bis (3',5'-di-t-butyl-4'-hydroxybenzyl) malonate has a melting point of 140° C.

EXAMPLE 5

Di-3'-Methylphenyl-2,2-Bis-(3'',5''-d-t-butyl-4''-hydroxybenzyl) Malonate

Following the procedure of Example 4, di-3'-methylphenyl malonate is prepared by the reaction of m-methylphenol with malonyl chloride. The resulting malonate is then reacted with 3,5-di-t-butyl-4-hydroxybenzyl chloride to give di-3'-methylphenyl-2,2-bis-(3'',5''4''-hydroxybenzyl) malonate, m.p. 146°C.

EXAMPLE 6

Di-4'-t-octylphenyl-2,2-Bis-(3'',5''-di-t-butyl-4''-hydroxybenzyl) Malonate

Into a 1.5 liter sulfonation flask are put 103g (1 mol) of finely divided malonic acid, 427 g (2.06 mol) of a 4-t-octylphenol* (*4-(1,1,3,3-tetramethylbutyl) phenol) and 4 ml dimethylformamide in 300 g of hexane, and heated with slow stirring to a temperature of 65°–70° C. At that temperature over about 3 hours 262 g (2.2 mol) of thionyl chloride are added dropwise under the surface of the reaction mixture. Gaseous HCl and $SO_2$ are given off and absorbed in an absorption tower. The reactants are stirred for a further 2 hours at 65°–70 C. and treated once again with 4 ml of dimethylformamide. The reactants are stirred for a further hour at 70°–75° C. The original suspension during this time changes to a red-brown solution and gas evolution almost ceases. The solution is cooled to room temperature and treated with 150 g of petroleum ether. It is cooled without stirring to 0° C. and held at this temperature for 2 hours. The product deposits in crystalline form. The reaction mixture is filtered off with suction and the brown residue is washed with petroleum ether and dried with suction. The product is then dried under vacuum for 5 hours at 70° C. A yield of 390 g of di-4-t-octylphenyl malonate (81 percent of theoretical based on malonic acid) is obtained, practically colorless crystals, M.P. 109°–110° C.

A portion, 120 g (0.25 mol) of the ester so made and 170 g toluene were cooled to −10° C. Under stirring there was added at this temperature, dropwise over a period of 90 minutes, a freshly prepared solution of sodium methylate in methanol and simultaneously, through a second dropping funnel, 134 g (0.55 mol) of benzylchloride, in the form of a 45 percent solution in an aliphatic hydrocarbon solvent. There should always be a slight excess of alcoholate present, recognizable by the red color of the reaction mixture. (An excess of benzylchloride leads to a reversible change of the solution color to yellow).

The reaction is exothermic and it must therefore be well cooled. During the dropwise additions the deposition of NaCl begins; however the deposit remains always stirrable. After the entire dropwise addition of the sodium methylate solution the color changes to yellow with the dropwise addition of the remainder of the benzylchloride solution.

After the dropwise addition has been completed, the cooling bath is removed and the mixture is stirred 1 hour at room temperature. It is then warmed to 55° C. and stirred a further hour at this temperature. Then a few ml of acetic acid are added to give a pH of about 6. The reaction mixture is then heated to 60° C. and the solvent is completely drawn off under vacuum. The remaining red-brown oil is dissolved in hot methanol, the solution cooled to 0°–3° and kept at this temperature for about 5 hours. The reaction mixture is filtered under vacuum and the yellow residue is washed with 2 portions of hexane and then with water, after which the product displays only a light yellow tinge. The product is dried for 8 hours under vacuum at 70° C The yield is 190 g of di-4'''-t-octylphenyl-2,2-bis (3',5'-di-t-butyl-4'-hydroxybenzyl) malonate, M.P. 175°–176° C. This is 83 percent of the theoretical, based on the malonic ester.

After recrystallization from ligroin, colorless crystals, MP. 179°–80b$L$ C., are obtained.

EXAMPLES 7–15

Following the procedure of Example 4, using appropriately substituted phenols and 4-hydroxybenzyl chlorides various malonate esters of the general formula

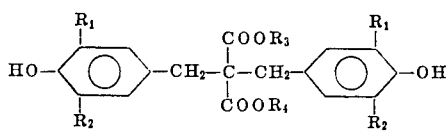

The melting points of these derivatives are indicated in Table A below.

TABLE A

| Example | $R_1$ | $R_2$ | $R_3$ and $R_4$ | M.P., °C. |
|---|---|---|---|---|
| 7 | t-Butyl | t-Butyl | —⟨phenyl⟩—sec butyl | 132 |
| 8 | do | do | —⟨phenyl⟩— t-butyl | 182 |
| 9 | do | do | —⟨phenyl⟩— isoamyl | 135 |
| 10 | do | do | —⟨phenyl⟩— t-hexyl* | 146 |
| 11 | do | do | —⟨phenyl⟩— t-hexyl* (with CH₃) | 150 |
| 12 | do | do | —⟨phenyl⟩— cyclohexyl | 188 |
| 13 | do | do | —⟨phenyl⟩— phenyl | 210 |
| 14 | do | Methyl | —⟨phenyl⟩— t-octyl | 170 |
| 15 | Methyl | do | —⟨phenyl⟩— t-octyl | 185 |

\*—C—C—C—C
         |
         C

EXAMPLE 16

Unstabilized polypropylene powder (Profax 6501) is thoroughly blended with 0.1% by weight of 3,3,bis-(3',5'-di-t-butyl-4'-hydroxybenzyl)-2,4-pentanedione and 0.5 percent dilauryl β-thiopropionate (DLTDP). The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition is stabilized against oxidative deterioration for 425 hours. Unstabilized polypropylene deteriorates after only 3 hours.

In like manner as the foregoing, a composition was prepared having 0.1 percent by weight di-n-octadecyl-4-(3',5'-di-t-butyl-4'-hydroxybenzyl)-4-cyanopimelate and 0.5% DLTDP. Sheets made from this composition were stabilized for 710 hours.

EXAMPLE 17

The compounds made in Examples 5, 7 and 9 were tested for their ability to stabilize polypropylene using the following technique:

One hundred (100) parts by weight of polypropylene were thoroughly mixed with 0.2 parts of the compound to be tested, or with 0.1 part of the test compound and 0.3 parts of dilaurylthiodipropionate (DLTDP), processed in a Brabender plastograph at 200° C. for 6 minutes and pressed into 40 mil sheets from which 0.4×7 inch test specimens are cut out.

Three test specimens at a time are placed on small steel hooks in each of two forced draft ovens maintained at 149° ± 0.5° C. and 135° ± 0.5° C. respectively. The specimens are examined regularly and the exposure time in days until visual degradation occurs, is noted.

In a second, accelerated testing procedure, bundles of small rectangular plates cut from the 40 mil sheets, four or five at a time are sliced into sections 1 mil thick using a heavy microtome with a D-type knife. Approximately 80-100 cuttings are sandwiched between two steel screens which are then mounted on a rack in one or the other of two forced draft ovens maintained at 147° and 135° C. respectively. The onset of embrittlement is easily recognized upon tapping the sample (screen) by hand and is taken as the point of failure.

In a somewhat different test, small rectangular plates cut from 40 mil sheets were exposed in a "Xenotest" irradiation apparatus and inspected for color after 200 and 500 hours irradiation.

The results of these tests are given in Table B.

2. A compound claimed in claim 1 wherein $R_5$ is

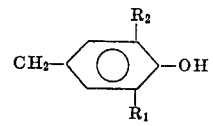

3. A compound claimed in claim 1 wherein $R_1$ and $R_2$ are tertiary butyl.

4. A compound claimed in claim 2 where $R_1$ and $R_2$ are tertiary butyl.

5. A compound selected from the group consisting of di-m-methylphenyl-2,2,bis(3',5'-di-t-butyl-4'-hydroxybenzyl)

TABLE B

| Sample | Stabilizer system compound of— | Oven aging | | | | Color of 40-mil specimen during oven aging, after— | | Color of 40-mil specimen during Xenotest exposure, after— | |
|---|---|---|---|---|---|---|---|---|---|
| | | 40-mil specimens, hours at— | | 1-mil cuttings, hours at— | | Initial color | | | |
| | | 135° C. | 149° C. | 135° C. | 147° C. | | 5 days | Failure | 200 hours | 500 hours |
| 1 | Example No. 6, 0.2 part/100 parts resin | 2,800 | 360 | 570 | 110 | 4-5 | 3-4 | 3 | 5 | 5 |
| 2 | Example No. 6, 0.1 part with 0.3 part DLTDP/100 parts resin | 3,800 | 800 | 670 | 150 | 5 | 4-5 | 2 | 4-5 | 4-5 |
| 3 | Example No. 4, 0.2 part/100 parts resin | 2,280 | 290 | 225 | 45 | 4 | 3 | 3 | 4 | 5 |
| 4 | Example No. 4, 0.1 part with 0.3 part DLDTP/100 parts resin | 3,240 | 790 | 240 | 65 | 5 | 4 | 3 | 3 | 3-4 |
| 5 | Example No. 8, 0.2 part/100 parts resin | 3,000 | 336 | 550 | 72 | 3-4 | 3 | 3-4 | 5 | 5 |
| 6 | Example No. 8, 0.1 part with 0.3 part DLTDP/100 parts resin | 4,260 | 840 | 550 | 96 | 5 | 3-4 | 2-3 | 5 | 5 |

What is claimed is:

1. A compound of the formula

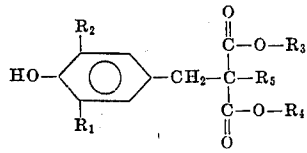

wherein $R_1$ and $R_2$ are alkyl groups having from one to eight carbon atoms, $R_3$ and $R_4$ are phenyl, mono or dialkyl substituted phenyl, the alkyl substituents having up to eight carbon atoms or cyclohexyl substituted phenyl, and $R_5$ is cyano, an alkyl group of from one to four carbon atoms or

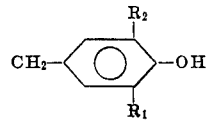

wherein $R_1$ and $R_2$ are as defined above.

malonate; di-4'-sec-butylphenyl-2,2-bis-(3",5"-di-t-butyl-4"-hydroxybenzyl) malonate; di-4'-isoamylphenyl-2,2-bis (3",5"-di-t-butyl-4"-hydroxybenzyl)malonate; di-4'-t-hexylbenzyl-2,2,-bis(3",5"-di-t-butyl-4"-hydroxybenzyl) malonate; di-2'-methyl-4'-t-hexylbenzyl-2,2-bis (3",5"-di-t-butyl-4"-hydroxybenzyl) malonate; di-4'-cyclohexylbenzyl-2,2-bis(3",5"-di-t-butyl-4"-hydroxybenzyl) malonate; di-4'-phenylphenyl-2,2-bis (3",5"-di-t-butyl-4"-hydroxybenzyl) malonate; di-4'-t-octylphenyl-2,2-bis(3"t-butyl-5"-methyl-4"-hydroxybenzyl) malonate; di-4'-t-octylphenyl-2,2,bis (3",5" dimethyl-4"-hydroxybenzyl) malonate; di-4'-t-octylphenyl-2,2-bis (3",5"-di-t-butyl-4"-hydroxybenzyl) malonate; diphenyl-2,2-bis (3'5'<-di-t-butyl- 4'-hydroxybenzyl) malonate; di-4'di-t-butylphenyl-2,2-bis (3",5" -di-t-butyl-4"-hydroxybenzyl) malonate.

6. Di-4'-t-octylphenyl-2,2-bis-(3",5"-di-t-butyl-4'-hydroxybenzyl) malonate.

7. Diphenyl-2,2-bis(3',5'-di-t-butyl-4'-hydroxybenzyl) malonate.

8. Di-4'-t-butylphenyl-2,2-bis-(3",5"-di-t-butyl-4"-hydroxybenzyl) malonate.

* * * * *

UNITED STATES PATENT OFFICE
CERTIFICATE OF CORRECTION

Patent No. 3,678,095          Dated July 18, 1972

Inventor(s) Martin Dexter et al

It is certified that error appears in the above-identified patent and that said Letters Patent are hereby corrected as shown below:

On the cover sheet [73] the name of the assignee should read -- CIBA-GEIGY Corporation --.

Signed and sealed this 19th day of December 1972.

(SEAL)
Attest:

EDWARD M. FLETCHER, JR.
Attesting Officer

ROBERT GOTTSCHALK
Commissioner of Patents

UNITED STATES PATENT AND TRADEMARK OFFICE
CERTIFICATE OF CORRECTION

PATENT NO. : 3,678,095
DATED : July 18, 1972
INVENTOR(S) : Martin Dexter and John Denon Spivack It is certified that error appears in the above-identified patent and that said Letters Patent are hereby corrected as shown below:

Column 1, line 41, "$U_1$" should read -- $Y_1$ --.

Column 1, line 46, "$Y_5$" should read -- $R_5$ --.

Column 6, line 75, "(3",5"4"-hydroxybenzyl)" should read -- (3",5"-di-t-butyl-4"-hydroxybenzyl) --.

Column 7, line 64, "179°-80bLC.," should read -- 179°-80°C., --.

Column 8, Example 7 of Table A, "see butyl" should read -- sec butyl --.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*